United States Patent
Komaba et al.

(10) Patent No.: US 10,593,992 B2
(45) Date of Patent: Mar. 17, 2020

(54) NEGATIVE ELECTRODE FOR POTASSIUM ION SECONDARY BATTERIES, NEGATIVE ELECTRODE FOR POTASSIUM ION CAPACITORS, POTASSIUM ION SECONDARY BATTERY, POTASSIUM ION CAPACITOR, AND BINDER FOR NEGATIVE ELECTRODES OF POTASSIUM ION SECONDARY BATTERIES OR NEGATIVE ELECTRODES OF POTASSIUM ION CAPACITORS

(71) Applicant: TOKYO UNIVERSITY OF SCIENCE FOUNDATION, Shinjuku-ku, Tokyo (JP)

(72) Inventors: Shinichi Komaba, Tokyo (JP); Kei Kubota, Tokyo (JP); Mouad Dahbi, Tokyo (JP); Tatsuya Hasegawa, Tokyo (JP)

(73) Assignee: TOKYO UNIVERSITY OF SCIENCE FOUNDATION, Tokyo (JP)

( * ) Notice: Subject to any disclaimer, the term of this patent is extended or adjusted under 35 U.S.C. 154(b) by 0 days.

(21) Appl. No.: 15/518,104

(22) PCT Filed: Sep. 3, 2015

(86) PCT No.: PCT/JP2015/075128
§ 371 (c)(1),
(2) Date: Apr. 10, 2017

(87) PCT Pub. No.: WO2016/059907
PCT Pub. Date: Apr. 21, 2016

(65) Prior Publication Data
US 2017/0294676 A1 Oct. 12, 2017

(30) Foreign Application Priority Data

Oct. 15, 2014 (JP) .................................. 2014-210867

(51) Int. Cl.
*H01M 10/054* (2010.01)
*H01M 4/62* (2006.01)
(Continued)

(52) U.S. Cl.
CPC .......... *H01M 10/054* (2013.01); *H01G 11/30* (2013.01); *H01G 11/32* (2013.01);
(Continued)

(58) Field of Classification Search
CPC .......................... H01M 10/054; H01M 10/052
See application file for complete search history.

(56) References Cited

U.S. PATENT DOCUMENTS 6,203,947 B1 * 3/2001 Peled .................. H01M 4/0445
429/221
6,316,142 B1 * 11/2001 Delnick ................ H01M 4/621
29/623.3
(Continued)

FOREIGN PATENT DOCUMENTS

| CN | 104011918 A | 8/2014 |
| GB | 2483372 A | 3/2012 |

(Continued)

OTHER PUBLICATIONS

Pasta et al. (nature communications | 3:1149 | DOI: 10.1038/ncomms2139 | www.nature.com/naturecommunications).*
(Continued)

*Primary Examiner* — Olatunji A Godo
(74) *Attorney, Agent, or Firm* — Cantor Colburn LLP

(57) ABSTRACT

Provided are: a potassium ion secondary battery which is not susceptible to deterioration of charge/discharge capacity even if charging and discharging are repeated, and which has a long service life as a secondary battery; a potassium ion capacitor; a negative electrode for the potassium ion secondary battery; and a negative electrode for the potassium
(Continued)

ion capacitor. A negative electrode for potassium ion secondary batteries and a negative electrode for potassium ion capacitors, each of which contains a carbon material that is capable of absorbing and desorbing potassium and a binder that contains a polycarboxylic acid and/or a salt thereof. A potassium ion secondary battery which is provided with the negative electrode or the capacitor. A binder for negative electrodes of potassium ion secondary batteries or negative electrodes of potassium ion capacitors, which contains a polycarboxylic acid and/or a salt thereof.

2 Claims, 21 Drawing Sheets

(51) Int. Cl.
    H01M 4/587    (2010.01)
    H01G 11/32    (2013.01)
    H01G 11/38    (2013.01)
    H01M 4/133    (2010.01)
    H01G 11/30    (2013.01)
    H01G 11/68    (2013.01)
    H01M 4/66     (2006.01)
    H01M 4/02     (2006.01)
(52) U.S. Cl.
    CPC ............ H01G 11/38 (2013.01); H01G 11/68
           (2013.01); H01M 4/133 (2013.01); H01M
           4/587 (2013.01); H01M 4/622 (2013.01);
           H01M 4/661 (2013.01); H01M 2004/027
                                              (2013.01)

(56) References Cited

U.S. PATENT DOCUMENTS

| 2008/0292959 | A1 | 11/2008 | Inoue et al. | |
|---|---|---|---|---|
| 2009/0011333 | A1 | 1/2009 | Wakita et al. | |
| 2010/0319188 | A1 | 12/2010 | Yamazaki et al. | |
| 2011/0117448 | A1 | 5/2011 | Inoue et al. | |
| 2011/0241101 | A1 | 10/2011 | Ino et al. | |
| 2012/0148921 | A1 | 6/2012 | Lee et al. | |
| 2014/0349185 | A1* | 11/2014 | Momose | H01M 4/13 429/217 |
| 2016/0071658 | A1 | 3/2016 | Azais et al. | |

FOREIGN PATENT DOCUMENTS

| GB | 2487569 A | 8/2012 |
|---|---|---|
| GB | 2492167 A | 12/2012 |
| GB | 2495951 A | 5/2013 |
| JP | 2003151549 A | 5/2003 |
| JP | 2006216510 A | 8/2006 |
| JP | 2006216511 A | 8/2006 |
| JP | 2007173210 A | 7/2007 |
| JP | 2008159634 A | 7/2008 |
| JP | 2009016245 A | 1/2009 |
| JP | 2011023710 A | 2/2011 |
| JP | 2011216715 A | 10/2011 |
| JP | 2012129490 A | 7/2012 |
| JP | 2013229319 A | 11/2013 |
| JP | 2015064932 A | 4/2015 |
| KR | 1020070100919 A | 10/2007 |
| KR | 1020140018255 A | 2/2014 |
| WO | 2011013756 A1 | 2/2011 |
| WO | 2012101450 A1 | 8/2012 |
| WO | 2013061079 A1 | 5/2013 |
| WO | 2014173891 A1 | 10/2014 |
| WO | WO2013105623 * | 11/2014 |

OTHER PUBLICATIONS

European Search Report for corresponding EP Application No. 15850765.7-1373 PCT/JP2015075128; dated Jul. 14, 2017.
Office Action issued to KR Patent Application No. 10-2017-7008054, dated Feb. 27, 2018.
SIPO Office Action corresponding to CN Application No. 201580055439.7; dated Oct. 8, 2018.
A.D. Pelton, "The Cu-K (Copper13 Potassium) System", Bulletin of Alloy Phase Diagrams 1986, vol. 7, No. 3 , p. 231.
International Search Report corresponding to Application No. PCT/JP2015/075128; dated Nov. 2, 2015, with English translation.
Y. Du et al., "Thermodynamic Modeling of the Al—K System", Journal of Mining and Metallurgy, Section B: Metallurgy 2009, 45 (1) , pp. 89-93.
Z. Wang et al., "Diffusion of alkali metals in the first stage graphite intercalculation compounds by vdW-DFT calculations", RSC Advances 2015, 5 (21), pp. 15985-15992.
JP Notification of Reasons for Refusal issued in the JP Patent Application No. 2016-554012, dated Jul. 30, 2019.

* cited by examiner

NEGATIVE ELECTRODE FOR POTASSIUM ION SECONDARY BATTERIES, NEGATIVE ELECTRODE FOR POTASSIUM ION CAPACITORS, POTASSIUM ION SECONDARY BATTERY, POTASSIUM ION CAPACITOR, AND BINDER FOR NEGATIVE ELECTRODES OF POTASSIUM ION SECONDARY BATTERIES OR NEGATIVE ELECTRODES OF POTASSIUM ION CAPACITORS

CROSS REFERENCE TO RELATED APPLICATIONS

This is the U.S. national stage of application No. PCT/JP2015/075128, filed on Sep. 3, 2015. Priority under 35 U.S.C. § 119(a) and 35 U.S.C. § 365(b) is claimed from Japanese Application No. 2014-210867, filed Oct. 15, 2014, the disclosure of which is also incorporated herein by reference.

TECHNICAL FIELD

The present invention relates to a negative electrode for potassium ion secondary batteries or potassium ion capacitors, and also relates to a potassium ion secondary battery or a potassium ion capacitor including at least the above negative electrode, and further relates to a binder for negative electrodes of potassium ion secondary batteries or potassium ion capacitors.

BACKGROUND ART

Currently, nonaqueous-electrolyte secondary batteries in which charge-discharge is, for example, performed by allowing lithium ions to move between a positive electrode and a negative electrode using a nonaqueous electrolyte are widely used as secondary batteries with high energy density.

In such a nonaqueous-electrolyte secondary battery, a lithium-transition metal composite oxide having a layered structure such as lithium nickelate (LiNiO2) and lithium cobaltate (LiCoO2) is commonly used as a positive electrode, and a carbon material, lithium metal, a lithium alloy or the like capable of occluding and releasing lithium ions is used as a negative electrode (for example, see Patent Document 1). A lithium ion capacitor having a negative electrode in which lithium ions are added to a carbon material capable of occluding lithium ions has also been developed.

However, the amount of lithium resource is relatively limited, and lithium is expensive. Further, reserves are unevenly distributed, and many are found in South America. Consequently, Japan needs to import lithium entirely from abroad. Accordingly, sodium-ion secondary batteries intended for use in place of lithium-ion secondary batteries are currently under development for stable supply of low cost batteries. However, a carbon material which can be used for them is limited to hard carbon (for example, see Patent Document 2).

Recently, researchers have begun to explore the possibility of nonaqueous-electrolyte secondary batteries in which potassium ions are used instead of lithium ions and sodium ions. Potassium, which is abundantly contained in both sea water and earth crust, is a stable resource, allowing for low cost products. Proposed is a potassium-ion secondary battery having a current collector as a negative electrode, the current collector being prepared by applying a slurry to a copper foil, the slurry being prepared by mixing graphite as a negative-electrode active material with poly(vinylidene fluoride) (PVdF) as a binder in a mass ratio of 95:5 (for example, see Patent Document 3).

Potassium is known not to make an alloy with aluminum or copper at ordinary temperature (for example, see Non Patent Documents 1 and 2). Further, computational chemistry studies have shown that potassium may have a fast diffusion rate in graphite (for example, see Non Patent Document 3).

Patent Document 1: Japanese Unexamined Patent Application, Publication No. 2003-151549

Patent Document 2: Japanese Unexamined Patent Application, Publication No. 2013-229319

Patent Document 3: Japanese Unexamined Patent Application, Publication No. 2006-216511

Non Patent Document 1: Pelton, A. D., "The Cu—K (Copper-Potassium) system.", Bulletin of Alloy Phase Diagrams, 1986, 7 (3), 231-231.

Non Patent Document 2: Du, Y., and other three persons, "Thermodynamic modeling of the Al—K system.", Journal of Mining and Metallurgy, Section B: Metallurgy, 2009, 45 (1), 89-93.

Non Patent Document 3: Wang, Z., and other three persons, "Diffusion of alkali metals in the first stage graphite intercalation compounds by vdW-DFT calculations.", RSC Advances, 2015, 5 (21), 15985-15992.

DISCLOSURE OF THE INVENTION

Problems to be Solved by the Invention

However, a structure and the like of a reproducible potassium-ion secondary battery have not been reported. In fact, with regard to intercalation of potassium ions into graphite, no report has been found stating that an electrochemical reversible intercalation-release reaction is achieved as in a graphite electrode in a lithium ion battery. Although a method of synthesizing of a K-intercalatable graphite intercalation compound having a composition of KC8 has been reported, the method is based on a chemical reaction. Therefore, a successful electrochemical reaction which can be used for secondary batteries has not been known.

An object of the present invention is to provide a potassium ion secondary battery and a potassium ion capacitor which have not been essentially reported in the conventional art. An object of the present invention is to provide a potassium ion secondary battery having a charge-discharge capacity less deteriorated even after repeated charge-discharge cycles (cycle durability) and a long life time as a secondary battery. Yet another object of the present invention is to provide a negative electrode for potassium ion secondary batteries which can confer these superior properties on a secondary battery.

Means for Solving the Problems

The present inventors find that a potassium ion secondary battery and a potassium ion capacitor each having a negative electrode can show a superior cycle durability and a long life time as a secondary battery and a potassium ion capacitor when the negative electrode includes: a carbon material capable of occluding and releasing potassium ions; and a binder including polycarboxylic acid and/or a salt thereof. Then the present invention has been completed. Specifically, the present invention may provide the followings.

(1) A negative electrode for potassium ion secondary batteries or potassium ion capacitors, comprising: a carbon material capable of occluding and releasing potassium ions; and a binder including polycarboxylic acid and/or a salt thereof.

(2) The negative electrode for potassium ion secondary batteries or potassium ion capacitors according to (1), wherein the carbon material includes graphite.

(3) The negative electrode for potassium ion secondary batteries or potassium ion capacitors according to (1) or (2), wherein the polycarboxylic acid and/or a salt thereof includes at least one selected from the group consisting of polyacrylic acid, alkali metal salts of polyacrylic acid, carboxymethylcellulose, and alkali metal salts of carboxymethylcellulose.

(4) The negative electrode for potassium ion secondary batteries or potassium ion capacitors according to any one of (1) to (3), further comprising a negative-electrode current collector including aluminum.

(5) A potassium ion secondary battery or a potassium ion capacitor, comprising the negative electrode according to any one of (1) to (4).

(6) A binder for negative electrodes of potassium ion secondary batteries or potassium ion capacitors, comprising polycarboxylic acid and/or a salt thereof.

Effects of the Invention

The present invention can provide a potassium ion secondary battery having superior cycle durability and a long life time as a secondary battery, and also can provide a negative electrode with which the above secondary battery can be obtained. Further, the present invention can provide a very high reversible capacity. The present negative electrode can also be used for potassium ion capacitors.

PREFERRED MODE FOR CARRYING OUT THE INVENTION

Figure 1:
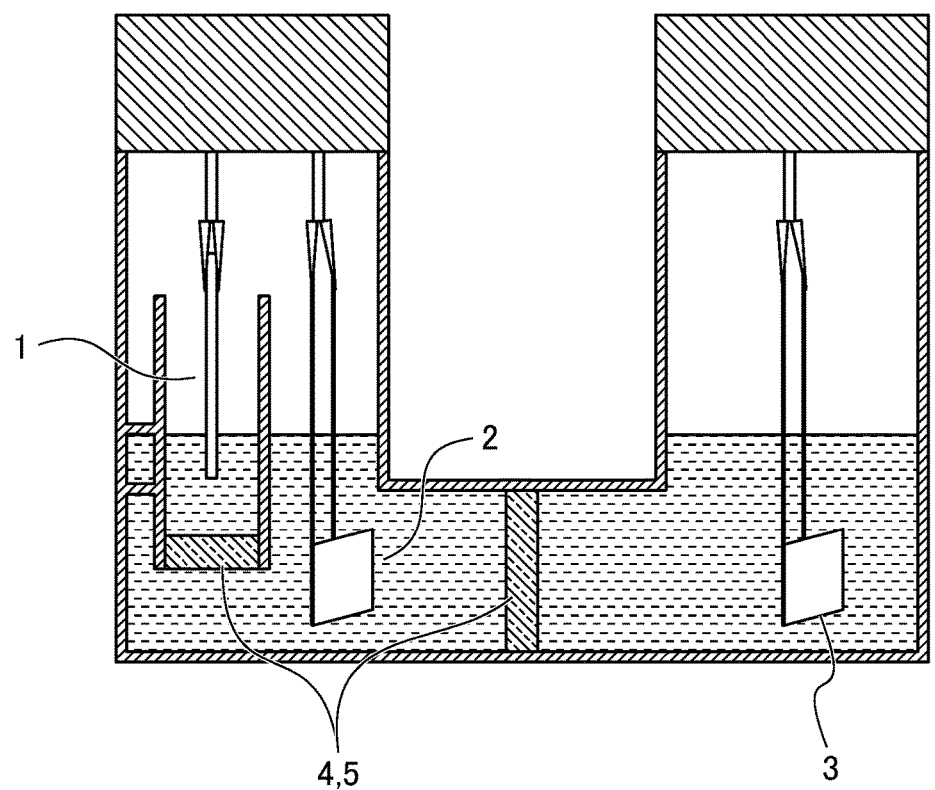
FIG. 1 is a schematic diagram illustrating the structure of an H-type cell used for precipitating potassium metal which will serve as a counter-electrode active material in Example 1.

Below, embodiments of the present invention will be described.

[Negative Electrode for Potassium Ion Secondary Batteries]

The negative electrode for potassium ion secondary batteries according to the present invention (hereinafter may be referred to as the "negative electrode" for short) includes a carbon material capable of occluding and releasing potassium; and a binder including polycarboxylic acid and/or a salt thereof. A potassium ion secondary battery including the above negative electrode can provide a charge-discharge capacity less deteriorated even after repeated charge-discharge cycles (this property may be referred to the "cycle durability" in this description) and a long life time as a secondary battery. In addition, it can provide a very high reversible capacity.

The carbon material capable of occluding and releasing potassium in the negative electrode according to the present invention (hereinafter may be referred to as the "negative-electrode carbon") may serve as an active material. There is no particular limitation for the negative-electrode carbon as long as it can occlude and release potassium. Examples of the negative-electrode carbon include, for example, those containing graphite; soft carbon as an example of low crystallinity carbon, fulleren, general carbon nano materials, polyacene; carbon black (Ketjen black, acetylene black, channel black, lamp black, oil furnace black, thermal black, and the like); hard carbon; and the like. Those containing graphite are preferred. In the present invention, the above materials exemplified as the negative electrode carbon may be used alone or may be used in combination of two or more.

When graphite is used, the resulting potassium ion secondary battery may have a very high reversible capacity. Therefore, it can have a long run time by one charge, and provide a higher voltage. Further, it may likely have a high energy density. As used herein, graphite refers to a graphite-based carbon material. Graphite-based carbon materials include, for example, natural graphite, artificial graphite, expanded graphite, and the like. As natural graphite, for example, scale-like graphite, massive graphite, and the like may be used. As artificial graphite, for example, massive graphite, vapor growth graphite, scale-like graphite, fibrous graphite, and the like may be used. Among these, scale-like graphite and massive graphite are preferred in view of high packing density and others. Further, two or more types of graphite may be used in combination. The mean particle size of graphite preferably has an upper limit of 30 μm, more preferably 15 μm, and even more preferably 10 μm, and preferably has a lower limit of 0.5 μm, more preferably 1 μm, and even more preferably 2 μm. The mean particle size of graphite represents a value measured by the electron microscopy. Examples of graphite further include those having an interplanar spacing d (002) of 3.354 to 3.370 Å and a crystallite size Lc of 150 Å or more; and the like. Conveniently, types of graphite which can not be used for sodium ion secondary batteries due to lack of reactivity with sodium can be used in the present invention.

It is noted that the term "hard carbon" refers to non-graphitizable carbon which maintains its random structure without showing transition to graphite even when calcined at 3000° C. In contract, the term "soft carbon" refers to graphitizable carbon which shows transition to graphite when calcined at 3000° C. These may be classified as low crystallinity carbon.

A negative-electrode active material may include an additional negative-electrode active material along with negative-electrode carbon. Examples of the additional negative-electrode active material include, for example, elemental elements which can make an alloy with potassium, such as Ge, Sn, Pb, In, Zn, Ca, Sr, Ba, Ru, Rh, Ir, Pd, Pt, Ag, Au, Cd, Hg, Ga, Tl, C, N, Sb, Bi, O, S, Se, Te, and Cl; and intermetallic compounds; oxides containing these elements (silicon monoxide (SiO), $SiO_x$ ($0<x<2$), tin dioxide ($SnO_2$), $SnO_x$ ($0<x<2$), $SnSiO_3$, and the like); carbides (silicon carbide (SiC) and the like); and the like. Further, they also include, for example, various titanium dioxides, potassium-transition metal composite oxides such as potassium-titanium composite oxides (potassium titanate: $K_2Ti_3O_7$, $K_4Ti_5O_{12}$) and the like. These additional negative-electrode active materials may be used alone or may be used in combination of two or more.

Inclusion of negative-electrode carbon alone in a negative-electrode active material without including an additional negative-electrode active material can also provide the effect of the present invention. The negative-electrode carbon according to the present invention may consist only of graphite.

A binder in the negative electrode for potassium ion secondary batteries according to the present invention includes polycarboxylic acid and/or a salt thereof (hereinafter collectively referred to "polycarboxylic acid and the like"). Polycarboxylic acid and the like, which have a large number of hydrogen-bonding sites, allowing moisture to be kept inside the binder, can reduce degradation of an electrolytic solution due to water, resulting in decreased deposition of degradation products at the surface of the negative electrode. This, in turn, can prevent a decrease in capacity, and enables superior cycle durability.

As used in the present description and the accompanying claims, the term "polycarboxylic acid" means a polymer in which carboxy groups are directly or indirectly attached to 10% or more of the polymer constituent units (that is, units composed of monomer units. The same applies hereinafter.) on average. The term "polycarboxylate" means a polymer in which carboxy groups are directly or indirectly attached to 10% or more of the polymer constituent units on average, and at least some of the carboxy groups form salts with bases. Further, the term "alkali metal salt of polycarboxylic acid" means a polymer in which carboxy groups are directly or indirectly attached to 10% or more of the polymer constituent units on average, and at least some of the carboxy groups form salts with alkaline metals.

There is no particular limitation for the base in polycarboxylate. Sodium and potassium are preferred. As polycarboxylate, alkali metal salts of polycarboxylic acid are preferred.

The polymer main chain (in some cases, a side chain as well) of polycarboxylic acid and the like may include a constituent unit such as a substituted or unsubstituted aliphatic hydrocarbon group (for example, methylene group), a substituted or unsubstituted alicyclic hydrocarbon group (for example, β-glucose), and a substituted or unsubstituted aromatic hydrocarbon group (for example, phenylene group). Polycarboxylic acid and polycarboxylate may be a homopolymer, or may be a copolymer. In the case of a copolymer, it may be any of a random copolymer, an alternating copolymer, a block copolymer, or a graft copolymer. They may be used alone, or may be used in combination of two or more.

As polycarboxylic acid, preferred are poly(meth)acrylic acid and carboxymethylcellulose. As used in the present description and the accompanying claims, the term "poly (meth)acrylic acid" conceptually encompasses polyacrylic acid and polymethacrylic acid, and may be a copolymer in which acrylic acid and methacrylic acid as monomers are mixed and polymerized.

There is no particular limitation for the binder in the negative electrode according to the present invention as long as it includes at least one of polycarboxylic acid or polycarboxylate. One or more polycarboxylic acids may be used in combination, or one or more polycarboxylates may be used in combination, or one or more polycarboxylic acids and one or more polycarboxylates may be used in combination. Further, inclusion of polycarboxylic acid and the like alone can provide the effect of the present invention, and thus polycarboxylic acid and the like alone may be contained in the binding agent used in the negative electrode according to the present invention.

As polycarboxylic acid and the like, alkali metal salts of polycarboxylic acid is preferred, and sodium poly(meth)acrylate and sodium carboxymethylcellulose are more preferred, and sodium poly(meth)acrylate is even more preferred, and sodium polyacrylate is even more preferred. The above polycarboxylic acid and/or a salt thereof are useful as a binder for negative electrodes of potassium ion secondary batteries. Such a binder for negative electrodes of potassium ion secondary batteries also is within the scope of the present invention.

The negative electrode according to the present invention, which includes a binder including polycarboxylic acid and the like, may include a negative-electrode active material preferably having a moisture content of 500 ppm or less, more preferably a moisture content of 300 ppm or less, more preferably a moisture content of 100 ppm or less, more preferably a moisture content of 50 ppm or less, and even more preferably a moisture content of 30 ppm or less. A negative-electrode active material having a reduced content of moisture and a binding agent including polycarboxylic acid as a hygroscopic polymer are used to form a negative electrode. Therefore, degradation of an electrolytic solution due to water can be reduced, resulting in decreased deposition of degradation products at the surface of the negative electrode. This, in turn, can prevent a decrease in capacity. Here, the moisture content of a negative-electrode active material can be measured with a Karl-Fisher moisture meter using a powder of the negative-electrode active material before forming an electrode as a measurement target.

The negative-electrode carbon according to the present invention is a layered carbon material containing potassium between layers during charging. When the negative-electrode carbon is graphite, the theory indicates that potassium ions can be intercalated into the negative-electrode carbon up to a composition represented by $KC_8$. According to the present invention, a reversible capacity very closed to the theoretical capacity can be achieved, and for example, a peak indicative of a composition represented by $KC_8$ can also be observed in an X-ray diffraction pattern.

The negative electrode according to the present invention preferably has a structure in which negative-electrode mixture layers are formed on the both surfaces of a negative-electrode current collector. The negative-electrode carbon and polycarboxylic acid and the like described above are preferably included in the negative-electrode mixture layers.

The negative-electrode current collector is preferably made of an electrically conductive material, for example, such as foil- or mesh-like nickel, aluminum, copper, and stainless steel (SUS). As the above electrically conductive material, nickel, aluminum, copper, and stainless steel (SUS) are preferred, and aluminum and copper are more preferred. An aluminum foil, which is usually inexpensive, can be used in place of an expensive copper foil commonly used for lithium ion batteries. For example, when an aluminum foil is used for both a negative-electrode current collector and a positive-electrode current collector, a potassium ion secondary battery or a potassium ion capacitor having a bipolar layered structure can be manufactured. In contrast, in the case of the conventional lithium-ion secondary battery or lithium ion capacitor, when an aluminum foil is used for both a positive-electrode current collector and a negative-electrode current collector, aluminum will make an alloy with lithium. Therefore, an aluminum foil can not be used for a negative-electrode current collector, and a copper foil needs to be used.

With regard to the content of the binder in the negative-electrode mixture layer, the optimum amount may generally vary depending on the particle size of a carbon powder to be used and the like. Nonetheless, the lower limit is preferably 0.5 mass %, more preferably 1 mass %, and even more preferably 5 mass %, and the upper limit is preferably 20 mass %, more preferably 15 mass %, and even more preferably 13 mass % in view of improved cycle durability, improved reversible capacity, and the like.

The negative electrode according to the present invention may further include an electrically conductive auxiliary agent, if desired. There is no particular limitation for the electrically conductive auxiliary agent. Examples of the electrically conductive auxiliary agents include, for example, particulate carbon such as acetylene black and Ketjen black; carbon nanotube (vapor-grown carbon fiber, CNT) such as VGCF®; other carbon materials used as electrically conductive auxiliary agents such as carbon fiber; and the like. However, they are not limited to these, and any conventionally known material which can be used in an already commercially available lithium-ion secondary battery as an electrically conductive auxiliary agent can be used. These electrically conductive auxiliary agents may be used alone, or may be used in combination of two or more.

There is no particular limitation for the negative electrode according to the present invention. For example, it may be manufactured by applying a negative-electrode mixture slurry to a negative-electrode current collector, the negative-electrode mixture slurry being prepared by adding and kneading a nonaqueous solvent and the like such as water, alcohol, and N-methyl-2-pyrrolidone; and being dried to form a negative-electrode mixture layer. Compression molding may be performed after the drying, if desired.

For example, when a granular negative-electrode active material is used, the negative-electrode mixture slurry may be prepared by mixing a negative-electrode active material, a binder, and optionally an electrically conductive auxiliary agent and a viscosity modifying solvent. There is no particular limitation for the method of applying a negative-electrode mixture slurry to a negative-electrode current collector, but, for example, the doctor blade method and the like can be used.

Subsequently, the negative electrode can be manufactured by attaching a negative-electrode tab to a region which does not have the negative-electrode active material in the negative-electrode current collector.

[Positive Electrode for Potassium Ion Secondary Batteries]

In the present invention, there is no particular limitation for the positive electrode for potassium ion secondary batteries (hereinafter may be referred to as the "positive electrode" for short) as long as it includes a positive-electrode active material for potassium ion secondary batteries (hereinafter may be referred to as the "positive-electrode active material" for short) capable of occluding and releasing potassium.

There is no particular limitation for the positive-electrode current collector, but, for example, those exemplified in the context of the negative-electrode current collector can be used. Those made of the same materials as the negative-electrode current collectors and/or those having similar foil- and mesh-like forms and the like as the negative-electrode current collectors may be used.

As the positive-electrode active material, preferred are compounds containing potassium as a constituent element in the composition thereof (hereinafter may be referred to as the "potassium-containing compound") in view of, for example, the capacity and output characteristics. Examples of the potassium-containing compound include, for example, layered oxide-based materials such as potassium-iron composite oxide ($NaFeO_2$), potassium-cobalt composite oxide ($KCoO_2$), potassium-chromium composite oxide ($KCrO_2$), potassium-manganese composite oxide ($KMnO_2$), potassium-nickel composite oxide ($KNiO_2$), potassium-nickel-titanium composite oxide ($KNi_{1/2}Ti_{1/2}O_2$), potassium-nickel-manganese oxide ($KNi_{1/2}Mn_{1/2}O_2$), potassium-iron-manganese composite oxide ($K_{2/3}Fe_{1/3}Mn_{2/3}O_2$), potassium-nickel-cobalt-manganese composite oxide ($KNi_{1/3}Co_{1/3}Mn_{1/3}O_2$); and solid solutions and non-stoichiometric compounds thereof. Examples of the potassium-containing compound also include, for example, potassium-manganese composite oxides ($K_2$/

3MnO2, KMn2O4), potassium-nickel-manganese composite oxides (K2/3Ni1/3Mn2/3O2, KNi1/2Mn3/2O2), and the like. Examples of the potassium-containing compound can further include, for example, olivine-based materials such as potassium-iron-phosphate compound (KFePO4), potassium-manganese-phosphate compound (KMnPO4), potassium-cobalt-phosphate compound (KCoPO4), and the like. Examples of the potassium-containing compound can also include, for example, fluorinated olivine-based materials such as K2FePO4F, K2MnPO4F, K2CoPO4F, and the like. Furthermore, they can include potassium-containing iron-cyano complex; potassium-containing iron-manganese complex; organic active materials such as polymer radical compounds and n-conjugated polymers known in the field of organic radical batteries; and the like. Moreover, they can include elements which can form compounds with potassium, such as solid sulfur, and sulfur-carbon composite materials, and the like. However, they are not limited to these, and publicly known materials can also be used such as other potassium-containing transition metal oxides, potassium-containing transition metal sulfides, potassium-containing transition metal fluorides, and potassium-containing transition metal complexes as long as they can occlude and release potassium.

When an electrolyte is used as the positive-electrode active material, the positive electrode can be manufactured by mixing a material including the electrolyte, an electrically conducting agent, and a binding agent (hereinafter may be referred to as the "positive-electrode material") with a nonaqueous solvent and the like to prepare a slurry as a positive-electrode mixture; and applying the above slurry to the surface of the aforementioned positive-electrode current collector; and then dried to form a positive-electrode active-material layer. There is no particular limitation for the above nonaqueous solvent and the like, but, examples of the above nonaqueous solvent and the like include, for example, water, alcohol, N-methyl-2-pyrrolidone, and the like. As the binder in the above positive-electrode material, at least one selected from, for example, poly(vinylidene fluoride), polytetrafluoroethylene, polyethylene oxide, polyvinyl acetate, polymethacrylate, polyacrylate, polyacrylonitrile, polyvinyl alcohol, styrene-butadiene rubber, carboxymethylcellulose, and the like can be used.

It is noted that when the amount of the binder is too large, a high energy density can not be obtained due to a decreased proportion of the positive-electrode active material contained in the positive-electrode material. Therefore, the amount of the binder is in the range of 0 to 30 wt % relative to the entire positive-electrode material, preferably in the range of 0 to 20 wt %, and more preferably in the range of 0 to 10 wt %.

As the electrically conducting agent in the positive-electrode material, for example, carbon materials exemplified in the context of the negative-electrode carbon and the like can be used. It is noted that when the addition amount of the electrically conducting agent is too small, the electrical conductivity of the positive-electrode material can not sufficiently be improved. In contrast, when the addition amount is too large, a high energy density can not be obtained due to a decreased proportion of the positive-electrode active material contained in the positive-electrode material. Therefore, the amount of the electrically conducting agent is in the range of 0 to 30 wt % relative to the entire positive-electrode material, preferably in the range of 0 to 20 wt %, and more preferably in the range of 0 to 10 wt %.

It may be manufactured by applying a positive-electrode mixture slurry to a positive-electrode current collector, the positive-electrode mixture slurry being prepared by mixing a binder and an electrically conducting agent with the above positive-electrode active material; and then adding and kneading a nonaqueous solvent and the like such as water, alcohol, and N-methyl-2-pyrrolidone; and dried to form a positive-electrode active-material layer. Compression molding may be performed after the above drying, if desired. Further, aluminum foam, nickel foam, and the like can be used as a positive-electrode current collector in order to improve electronic conductivity.

The positive electrode can be manufactured by attaching a positive-electrode tab to a region which does not have the positive-electrode active material in the positive-electrode current collector after the positive-electrode active material is applied to the positive-electrode current collector as described above.

[Potassium Ion Secondary Battery]

The potassium ion secondary battery according to the present invention includes a nonaqueous electrolyte in addition to the positive and negative electrodes described above.

[Nonaqueous Electrolyte]

There is no particular limitation for the nonaqueous electrolyte as long as it contains an electrolyte salt including potassium ions, but those in which the above electrolyte salt is dissolved in a nonaqueous solvent are preferred.

There is no particular limitation for the electrolyte salt as long as it includes potassium ions, but highly safe materials which are not peroxides soluble in a nonaqueous solvent are preferred. The electrolyte salts include, for example, N,N-bis(fluorosulfonyl)imide potassium (KFSI), N,N-bis(trifluoromethanesulfonyl)imide (KTFSI), potassium hexafluorophosphate (KPF6), potassium fluoroborate (KBF4), potassium perchlorate (KClO4), KCF3SO3, KBeTi, and the like. KFSI and KPF6 are preferred. The electrolyte salts may be used alone, or may be used in combination of two or more.

The concentration of an electrolyte salt in a nonaqueous electrolyte in which the electrolyte salt is dissolved in a nonaqueous solvent preferably has a lower limit of 0.5 mol/l, and more preferably 0.8 mol/l, and preferably has an upper limit of 2 mol/l, more preferably 1.5 mol/l, and even more preferably 1.2 mol/l.

Examples of the nonaqueous solvent include cyclic carbonate esters, chain carbonate esters, esters, cyclic ethers, chain ethers, nitriles, and amides which are used as nonaqueous solvents for common batteries; and those composed of combinations thereof.

Cyclic carbonate esters include ethylene carbonate, propylene carbonate, butylene carbonate, and the like. Those having some or all of their hydrogen groups fluorinated may also be used, including, for example, trifluoropropylene carbonate, fluoroethyl carbonate, and the like.

Chain carbonate esters include dimethyl carbonate, ethylmethyl carbonate, diethyl carbonate, methylpropyl carbonate, ethylpropyl carbonate, methylisopropyl carbonate, and the like. Those having some or all of their hydrogen groups fluorinated may also be used.

Esters include methyl acetate, ethyl acetate, propyl acetate, methyl propionate, ethyl propionate, γ-butyrolactone, and the like. Cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, crown ethers, and the like.

Chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimetoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl, and the like.

Nitriles include acetonitrile and the like. Amides include dimethylformamide and the like. These nonaqueous solvents may be used alone, or may be used in combination of two or more.

For the nonaqueous solvent, cyclic carbonate ester and chain carbonate ester are preferred, and combined use of cyclic carbonate and chain carbonate ester is more preferred. When cyclic carbonate ester and chain carbonate ester are used in combination as a nonaqueous solvent, there is no particular limitation for their ratio (cyclic carbonate ester: chain carbonate ester), but it is, for example, preferably 30:70 to 70:30 by the volume ratio, more preferably 40:60 to 60:40.

[Preparation of Potassium Ion Secondary Battery]

There is no particular limitation for the potassium ion secondary battery according to the present invention, but for example, it may have a similar configuration as a lithium-ion secondary battery, allowing the potassium ion secondary battery according to the present invention to be useful as a substitute for the current lithium-ion secondary batteries. A potassium ion secondary battery usually includes an exterior body. A negative-electrode current collector and a positive-electrode current collector are arranged inside the exterior body, and a negative-electrode tab and a positive-electrode tab are arranged so as to extend from the inside of the exterior body to the outside.

The followings merely represent examples of the configuration of a potassium ion secondary battery, and the present invention shall not be limited to these.

An exterior body may be formed with, for example, a laminate film having an inner aluminum layer. A negative-electrode mixture layer containing a negative-electrode active material and formed on a negative-electrode current collector and a positive-electrode active-material layer formed on a positive-electrode current collector are oppositely disposed each other through a separator.

A nonaqueous electrolyte is injected into the exterior body. Seal portions sealed by adhesion are formed at end portions of the exterior body in the sides where the negative electrode tab and the positive electrode tab extend to the outside. The negative electrode tab connected to the negative-electrode current collector extends to the outside through one of the above seal portions. The positive electrode tab connected to the positive-electrode current collector also extends to the outside through the other of the seal portions as in the negative electrode tab.

In the potassium ion secondary battery according to the present invention, potassium is released from the positive-electrode active-material layer, and occluded in the negative-electrode mixture layer through a nonaqueous electrolyte when charge is performed. When discharge is performed, potassium is released from the negative-electrode mixture layer, and occluded in the positive-electrode active-material layer through the nonaqueous electrolyte.

Potassium can be used as working ions in the potassium ion secondary battery according to the present invention, and potassium is present in the earth crust in an amount of about 1000 times more than lithium. Therefore, the potassium ion secondary battery can benefit from less expensive and more stable resource supply than lithium-ion secondary batteries. Further, the potassium ion secondary battery according to the present invention has excellent cycle durability, a long life time as a secondary battery, in particular a prolonged life time of a negative electrode, and excellent battery characteristics. Moreover, it can be quickly charged with an excellent rate characteristic (charging rate).

The potassium ion secondary battery according to the present invention has a reversible capacity of as large as about 250 mAh/g which is very close to the theoretical capacity of 279 mAh/g although potassium having a larger ionic radius than lithium is used. This may also provide an energy density higher than that of a conventional lithium-ion secondary battery having a graphite negative electrode. Potassium metal has a lower normal electrode potential than lithium metal, and the deposition potential of potassium metal is lower than that of lithium metal by about 0.15 V. Therefore, a rechargeable battery operatable at a higher potential than a lithium-ion secondary battery can be obtained.

[Potassium Ion Capacitor]

The aforementioned negative electrode for potassium ion secondary batteries can also be used as a negative electrode for potassium ion capacitors. In general, a potassium ion capacitor can be manufactured to have a similar configuration as that of a conventional lithium ion capacitor except that the aforementioned negative electrode is used as a negative electrode, and potassium ions are used instead of lithium ions. It is noted that at least one of a positive-electrode active material and a negative-electrode active material needs to be pre-doped with potassium in order to fully obtain the performance of a potassium ion capacitor. For example, when activated carbon is used as the positive-electrode active material, and graphite is used as the negative-electrode active material, the positive electrode and the negative electrode do not contain potassium by nature. Therefore, if potassium were not supplemented, the amount of ionic species for charge transfer would become insufficient. Moreover, in order to obtain a high-voltage potassium ion capacitor, the negative electrode is desirably pre-doped with potassium to reduce a negative-electrode potential. Potassium may be pre-doped during assembly of a capacitor. Potassium may be pre-doped, for example, in a state where potassium metal is placed inside a cell along with a positive electrode, a negative electrode, and a nonaqueous electrolyte so that the potassium metal is in liquid junction with the positive and negative electrodes. In that case, an insulating material may be present between the potassium metal and the positive and negative electrodes, or otherwise, conduction between the potassium metal and the positive electrode or the negative electrode may be allowed to be short-circuited. When conduction between the potassium metal and the positive electrode or the negative electrode is allowed, voltage may be applied between the potassium metal and the positive electrode or the negative electrode to force the positive electrode or the negative electrode to be doped with potassium.

EXAMPLES

Below, the present invention will be described in detail with reference to Examples. It is noted that the present invention shall not be in any way limited to Examples described below.

As described below, characteristics of a negative electrode (working electrode) of a potassium ion secondary battery as a half cell were evaluated by using graphite as a negative-electrode active material in the working electrode, and using potassium metal as an counter electrode. It is noted that the graphite electrode serves as a working electrode relative to the potassium-metal counter electrode in this half-cell, and thus a working-electrode active material, a working-electrode mixture slurry, and a working-electrode current collector described in the following examples correspond to the aforementioned negative-electrode active material, negative-electrode mixture slurry, and negative-electrode current collector, respectively.

Example 1

Production of Test Potassium Ion Secondary Battery (Half-cell)
(1) Production of Working Electrode
To water as a viscosity modifying solvent, 10 parts by mass of sodium polyacrylate (Kishida Chemical Co., Ltd., PAANa (molecular weight: 2,000,000 to 6,000,000)) as a binder was added, and 90 parts by mass of graphite (SEC Carbon, Limited., particle diameter: about 3 µm, SNO3) as a working-electrode active material was further added, and then mixed and stirred in a mortar to obtain a working-electrode mixture slurry. The resulting working-electrode mixture slurry was applied onto a nickel mesh (100-µm thick, 100 mesh, Tokyo Screen Co., Ltd.) as a working-electrode current collector (1 cm×1 cm), and dried in a vacuum drier at 150° C. to obtain a working electrode according to the present example. It is noted that the particle size of graphite was determined under an electron microscope.
(2) Production of Test Counter Electrode
Meanwhile, metal potassium was deposited on a nickel mesh (supra) to obtain a test counter electrode. Metal potassium was deposited in an H-type cell having an electrolytic solution therein by performing constant-current electrolysis at 0.45 mA for 24 hours. The electrolytic solution was prepared by dissolving 0.25 mol/l of potassium N,N-bis(fluorosulfonyl)imide (KFSI) in a nonaqueous solvent where ethylene carbonate (EC) and diethyl carbonate (DEC) had been mixed in the ratio of EC:DEC=1:1 (volume ratio). The H-type cell includes a nickel-mesh working electrode, a nickel-mesh reference electrode, a counter electrode of activated carbon sandwiched between nickel meshes, and a glass filter (thickness: 3.8 mm) separating these as shown in FIG. 1.
(3) Assembly of Test Potassium Ion Secondary Battery (Half-cell)
The working electrode and the test counter electrode described above were joined with an alligator clip, and immersed into a nonaqueous electrolyte in a beaker to obtain a test potassium ion secondary battery (half-cell). As the nonaqueous electrolyte, used was 1 mol/l of an electrolytic solution prepared by dissolving KFSI a nonaqueous solvent where EC and DEC had been mixed in the ratio of EC:DEC=1:1 (volume ratio).

Example 2

Production of Test Potassium Ion Secondary Battery (Half-cell)
A test potassium ion secondary battery (half-cell) was obtained as in Example 1 except that sodium carboxymethylcellulose (Daicel Chemical Industries, Ltd., CMC (viscosity-average molecular weight (Mv)=1,000,000)) was used instead of sodium polyacrylate, and acetylene black (Strem Chemicals Inc., particle size: about 50 nm) was used instead of graphite. It is noted that the particle size of acetylene black was determined by a method similar to that used for determining the particle size of graphite.

Comparative Example 1

Figure 2:
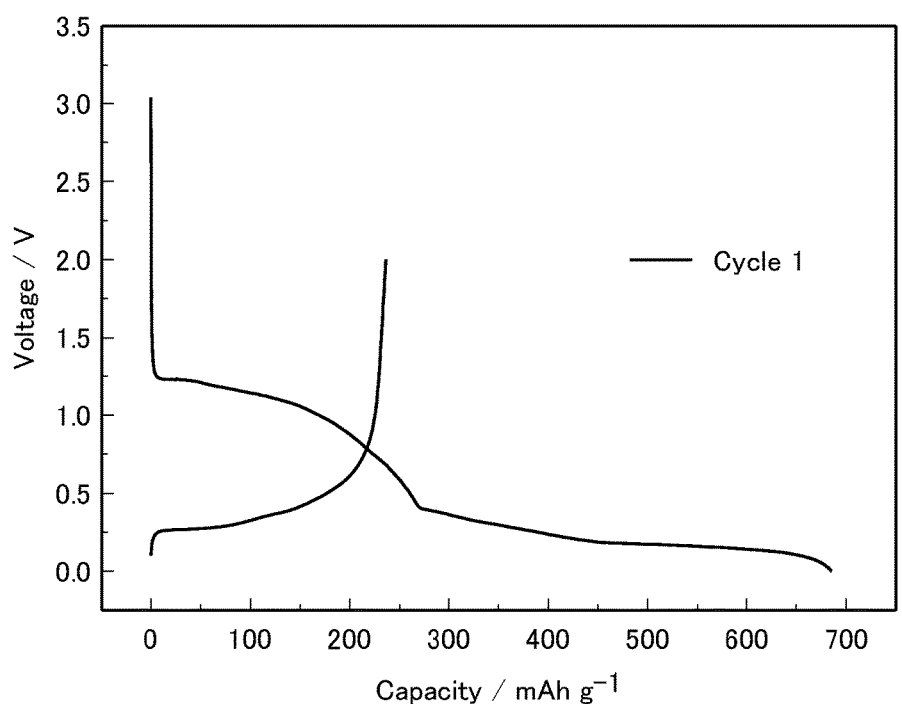
FIG. 2 is a graph illustrating the charge-discharge characteristics at the first cycle of a test potassium ion secondary battery from Example 1.
Figure 3:
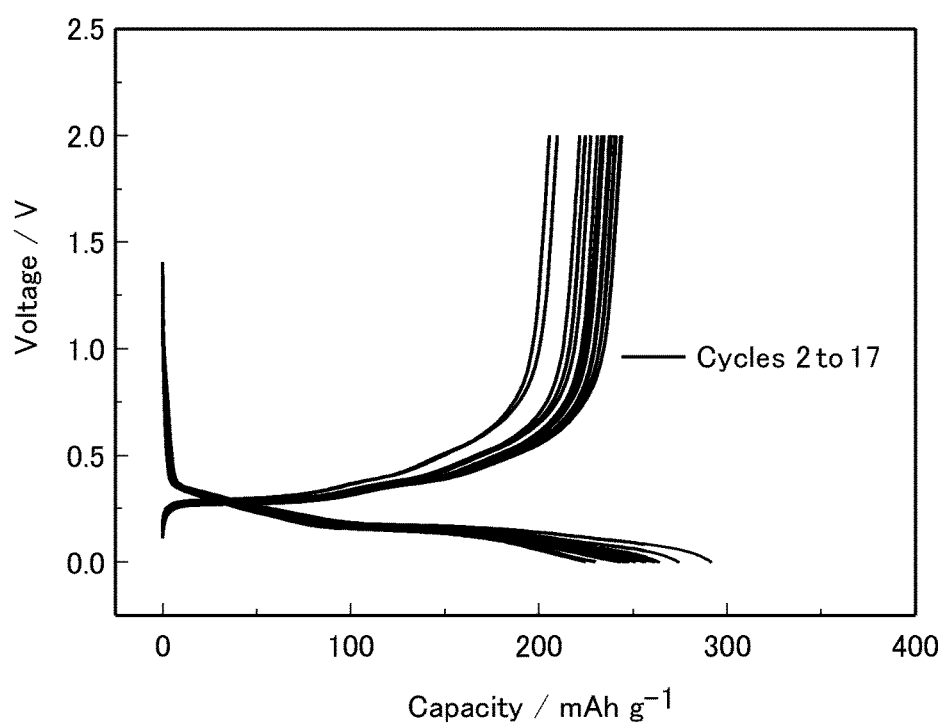
FIG. 3 is a graph illustrating the charge-discharge characteristics at the second to seventeenth cycles of the test potassium ion secondary battery from Example 1.
Figure 4:
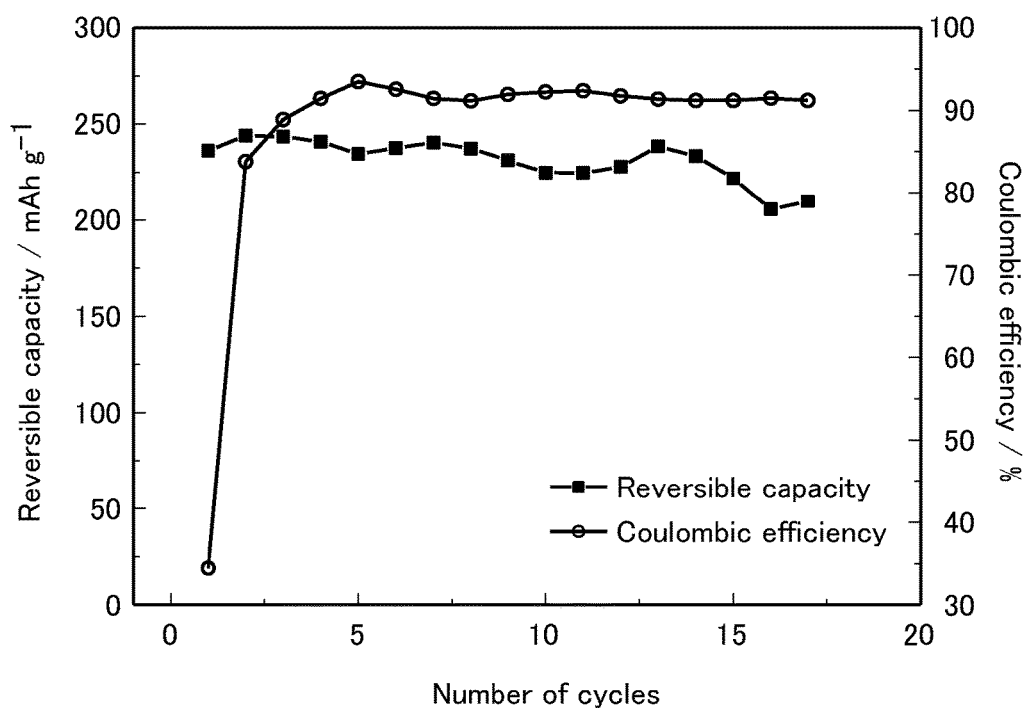
FIG. 4 is a graph illustrating the relationship between the number of cycles and the reversible capacity of the test potassium ion secondary battery from Example 1.
Figure 5:
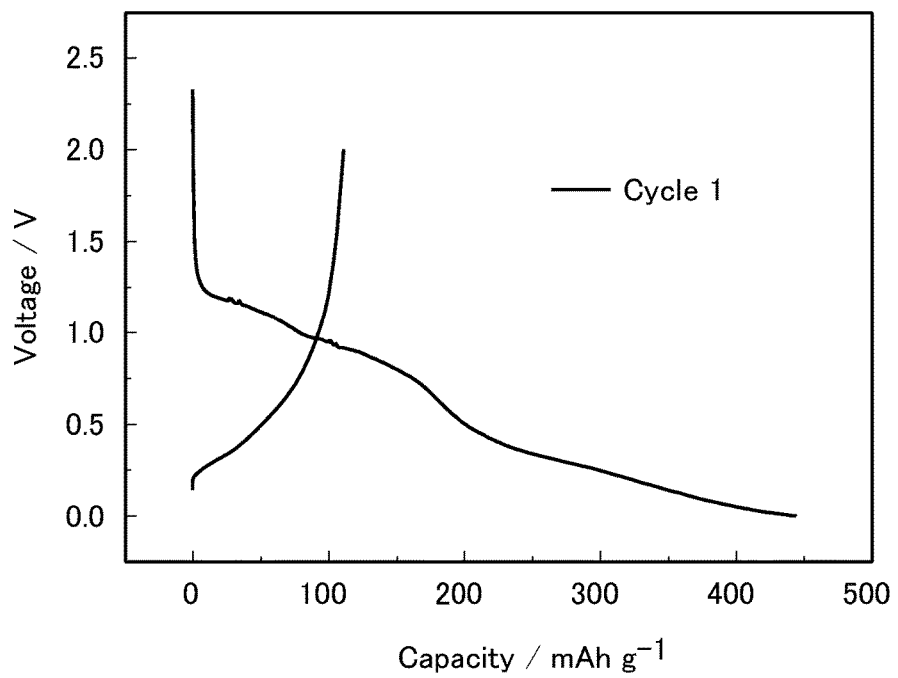
FIG. 5 is a graph illustrating the charge-discharge characteristics at the first cycle of a test potassium ion secondary battery from Example 2.
Figure 6:
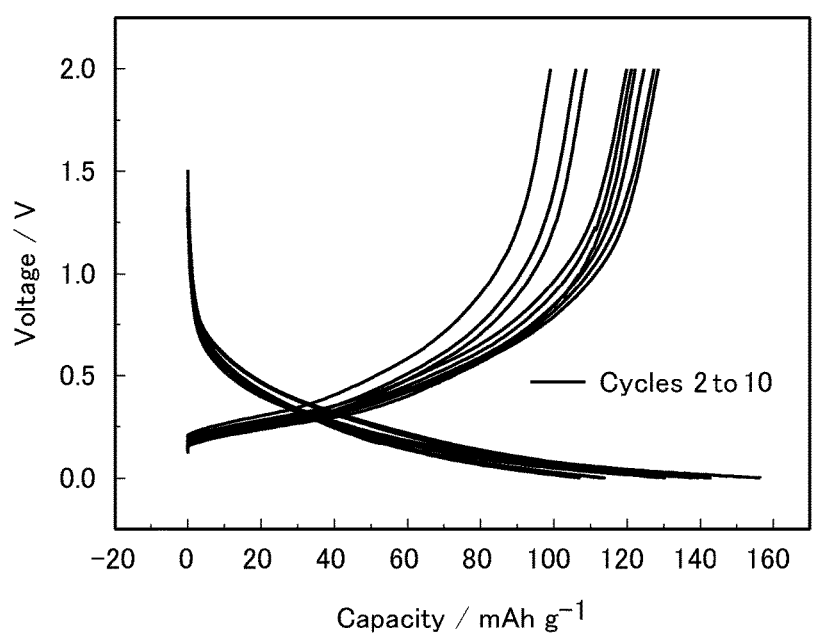
FIG. 6 is a graph illustrating the charge-discharge characteristics at the second to tenth cycles of the test potassium ion secondary battery from Example 2.
Figure 7:
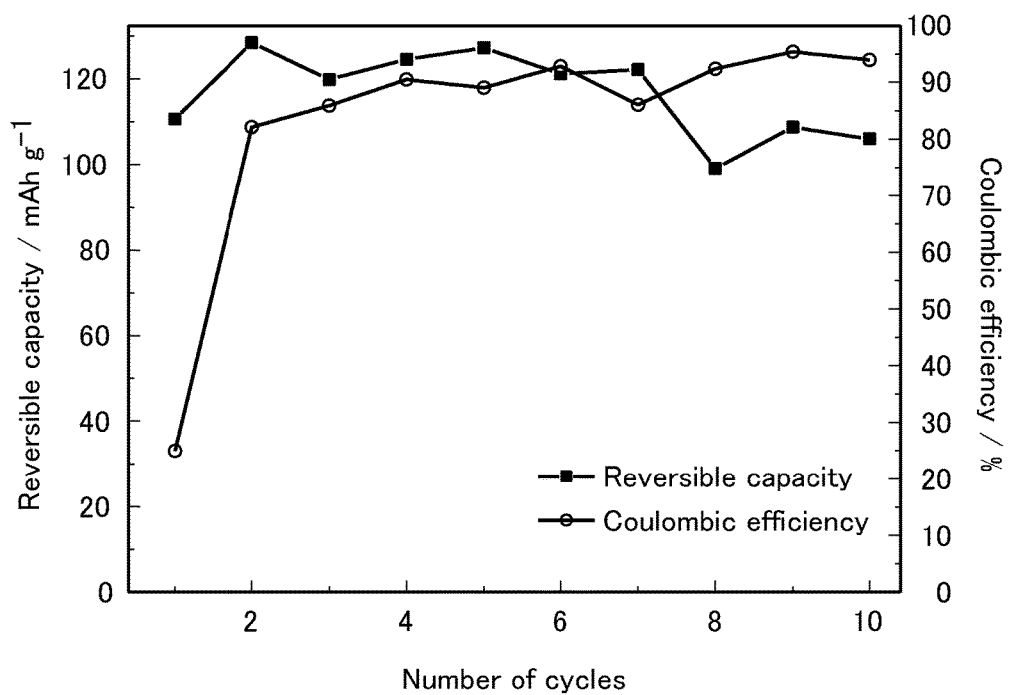
FIG. 7 is a graph illustrating the relationship between the number of cycles and the reversible capacity of the test potassium ion secondary battery from Example 2.
Figure 8:
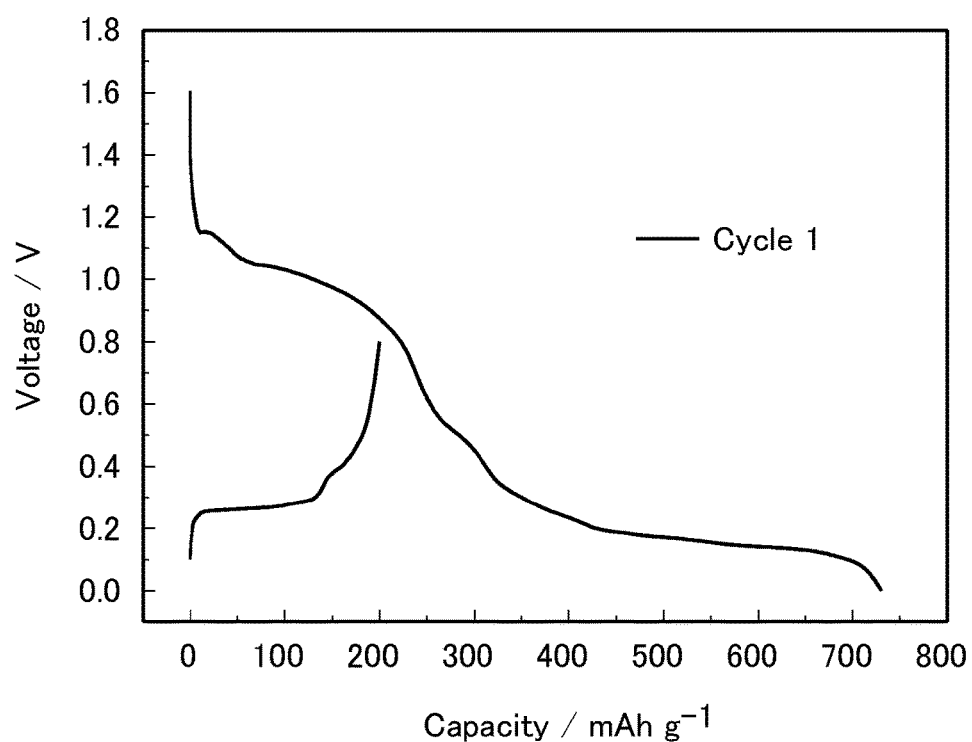
FIG. 8 is a graph illustrating the charge-discharge characteristics at the first cycle of a reference potassium ion secondary battery from Comparative Example 1.
Figure 9:
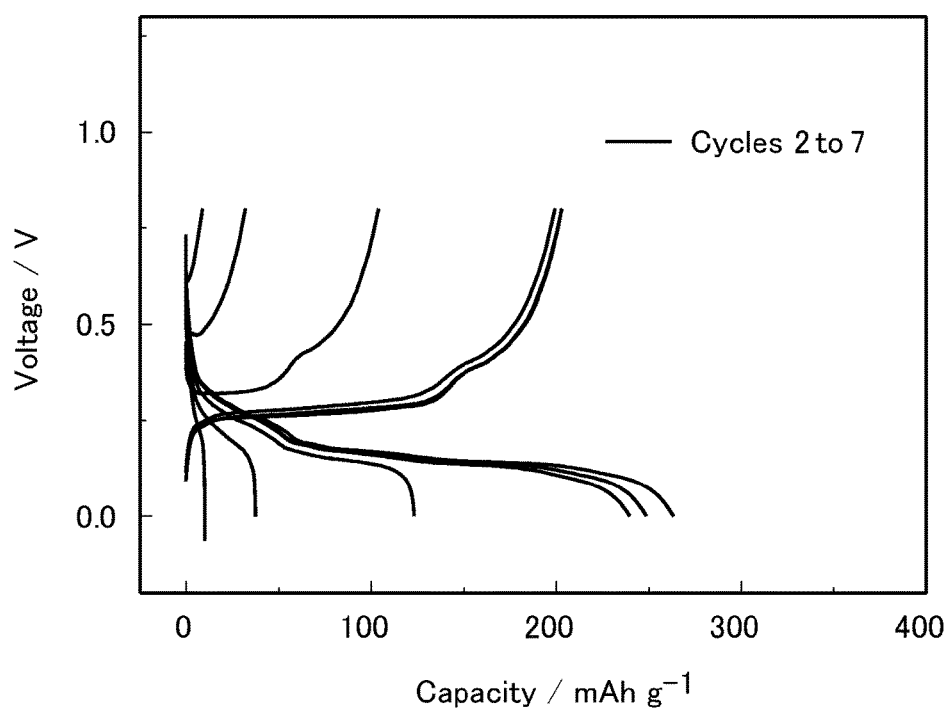
FIG. 9 is a graph illustrating the charge-discharge characteristics at the second to seventh cycles of the reference potassium ion secondary battery from Comparative Example 1.
Figure 10:
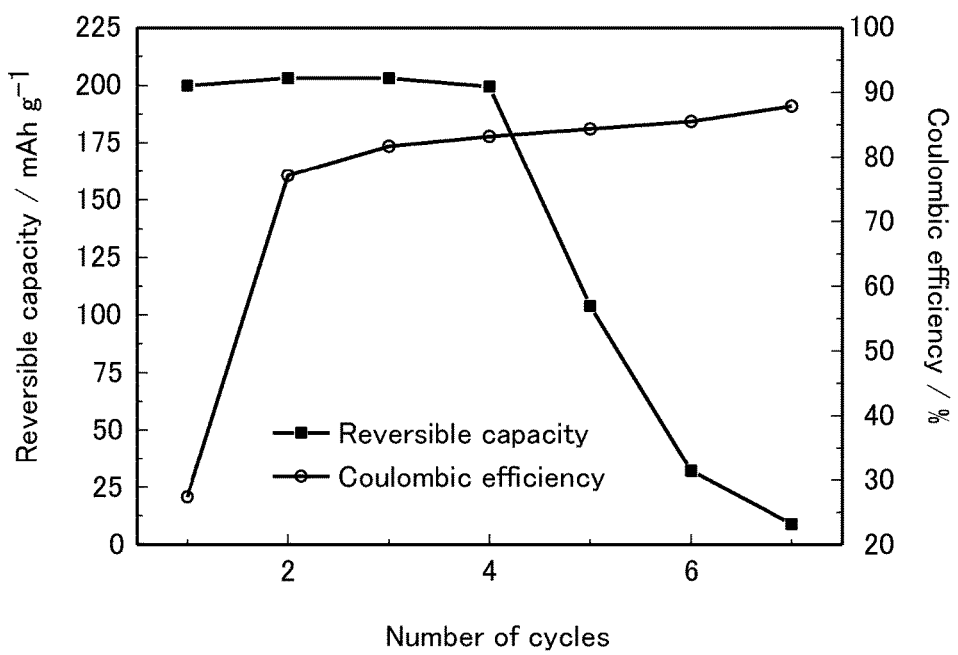
FIG. 10 is a graph illustrating the relationship between the number of cycles and the reversible capacity of the reference potassium ion secondary battery from Comparative Example 1.

Production of Reference Potassium Ion Secondary Battery (Half-cell)
A reference potassium ion secondary battery (half-cell) was obtained as in Example 1 except that poly(vinylidene fluoride) was used instead of sodium polyacrylate.
<Evaluation 1>
(1) The test potassium ion secondary battery (half-cell) produced in Example 1 was evaluated for charge-discharge characteristics. A current to each electrode was set so that the current density was 25 mA/g, and constant current charge was performed to a charge voltage of 2.0 V. After the charge, a current to each electrode was set so that the current density was 25 mA/g, and for the second time and later, constant current discharge was performed until a charge voltage of 2.0 V and a discharge cutoff voltage of 0 V. The above charge-discharge was repeated for 17 cycles. The charge-discharge curve at the first cycle is shown in FIG. 2 while the charge-discharge curves at the second to seventeenth cycles are shown in FIG. 3. Further, the relationships between the number of cycles and the reversible capacity, and between the number of cycles and the coulombic efficiency are shown in FIG. 4.
(2) The test potassium ion secondary battery (half-cell) produced in Example 2 was evaluated for charge-discharge characteristics as in the above (1) except that the charge-discharge was performed for 10 cycles. The charge-discharge curve at the first cycle is shown in FIG. 5 while the charge-discharge curves at the second to tenth cycles are shown in FIG. 6. The relationships between the number of cycles and the reversible capacity, and between the number of cycles and the coulombic efficiency are shown in FIG. 7.
(3) The reference potassium ion secondary battery (half-cell) produced in Comparative Example 1 was evaluated for charge-discharge characteristics as in the above (1) except that constant current charge was performed up to a charge voltage of 0.8 V, and constant current discharge was performed until a discharge cutoff voltage of 0 V, and this charge-discharge was performed for 7 cycles. The charge-discharge curve at the first cycle is shown in FIG. 8 while the charge-discharge curves at the second to seventh cycles are shown in FIG. 9. The relationships between the number of cycles and the reversible capacity, and between the number of cycles and the coulombic efficiency are shown in FIG. 10.
FIGS. 2 to 4 indicate that the test potassium ion secondary battery (half-cell) from Example 1 showed a small decrease in the reversible capacity even after repeated charge-discharge cycles, leading to a high reversible-capacity maintenance rate. Moreover, a reversible capacity of about 250 mAh/g, which was very close to the theoretical capacity of 279 mAh/g, was obtained, demonstrating that very good charge-discharge was performed. That is, the results revealed that potassium was reversibly occluded in and released from the working electrode including a carbon material. Similarly, FIGS. 5 to 7 indicate that the test potassium ion secondary battery (half-cell) from Example 2 showed a small decrease in the reversible capacity even after repeated charge-discharge cycles, leading to a high reversible-capacity maintenance rate. In contrast, FIGS. 8 to 10 indicate that the reference potassium ion secondary battery (half-cell) from Comparative Example 1 showed a significantly decreased reversible capacity after repeated charge-discharge cycles, resulting in a very low reversible-capacity maintenance rate. The figures also indicate that the reversible capacity was only about 200 mAh/g, and was clearly inferior to the reversible capacity from Example 1.

<Evaluation 2>

Figure 11:
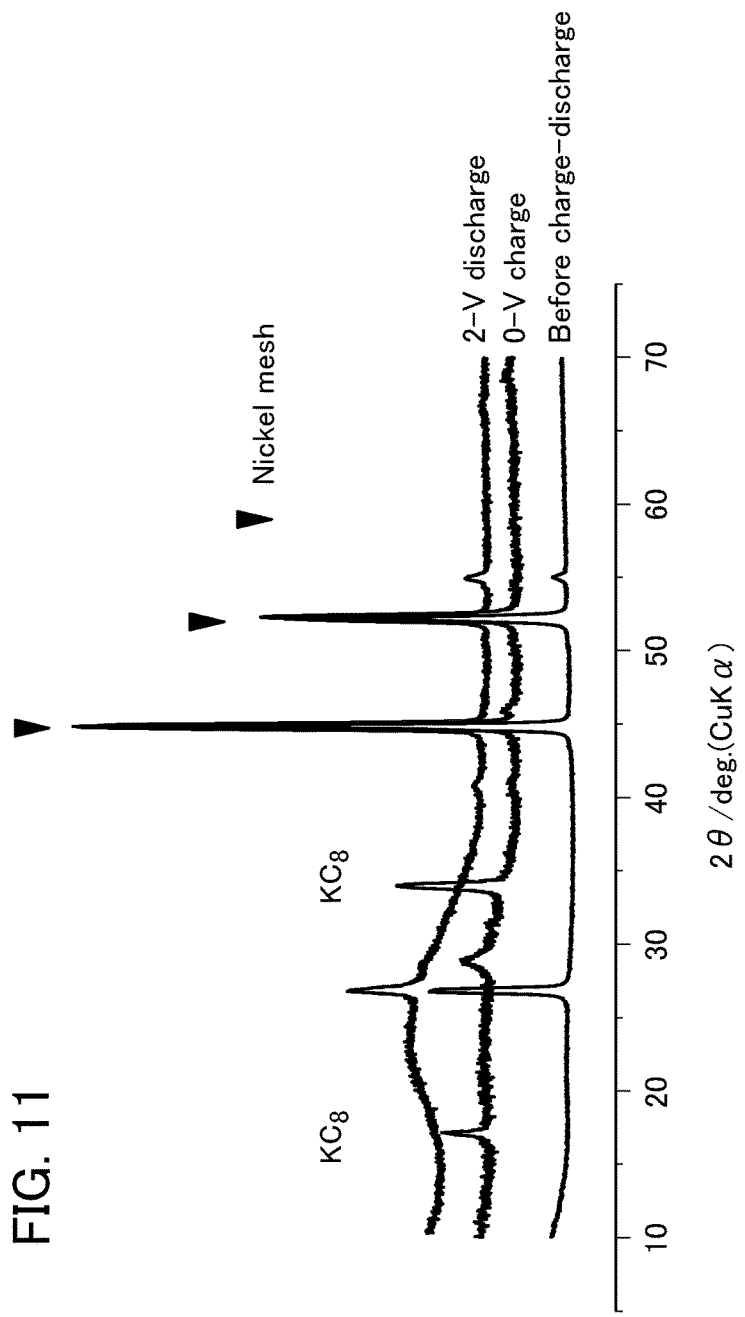
FIG. 11 shows X-ray diffraction patterns of the working electrode from Example 1.

The test potassium ion secondary battery (half-cell) produced in Example 1 in a charged state was disassembled, and the working electrode sheet including a carbon material was subjected to the powder X-ray diffraction (XRD). Specifically, measurements were performed with a Rigaku powder X-ray diffractometer MultiFlex under the following conditions. For XRD measurements, the working electrode sheet was protected with a gas barrier film (Mictron film®, Toray Industries, Inc.) to prevent exposure of the working electrode sheet to air. Measurement results are shown in FIG. 11.

X-ray: CuKα

Voltage-current: 40 kV-20 mA

Angle range for measurement: 2θ=10 to 70°

Step: 0.02°

Scan speed: 2°/min.

Theoretically, potassium ion can be intercalated in a negative electrode carbon to a composition represented by KC8 when a working electrode carbon is graphite. As shown in FIG. 9 for the negative electrode according to the present invention, the presence of peaks indicative of KC8 at around diffraction angles 2θ=17° and 34° appeared after the 0-V charge indicates that potassium was intercalated between graphite layers up to the theoretically maximal composition.

Example 3

Production of Potassium Electrochemical Cell

A copper foil as a working-electrode current collector was punched out into a circular shape with a diameter of 1 cm using an electrode punch machine to obtain a working electrode for the present example. A potassium electrochemical cell was obtained including metal potassium cut in a dimension of 0.5×0.5 cm a counter electrode, the above working electrode, and the same nonaqueous electrolyte as in Example 1. A coin cell was used as a cell, and a glass filter was used as a separator.

Example 4

Production of Potassium Electrochemical Cell

A potassium electrochemical cell was obtained as in Example 3 except that an aluminum foil was used instead of a copper foil.

Comparative Example 2

Production of Reference Lithium Electrochemical Cell

A reference lithium electrochemical cell was obtained as in Example 3 except that metal lithium cut out into a circular shape with a diameter of 1 cm was used as a counter electrode, and 1 mol/l of an electrolytic solution prepared by dissolving LiPF6 in a nonaqueous solvent where EC and dimethyl carbonate (DMC) had been mixed in the ratio of EC:DMC=1:1 (volume ratio) was used as an nonaqueous electrolyte.

Comparative Example 3

Production of Reference Lithium Electrochemical Cell

A reference lithium electrochemical cell was obtained as in Comparative Example 2 except that an aluminum foil was used instead of a copper foil.

<Evaluation 3>

Cyclic voltammetry (CV) measurements were performed for the potassium electrochemical cells each produced in Examples 3 and 4 and the reference lithium electrochemical cells each produced in Comparative Examples 2 and 3. The following conditions were used for CV measurements: the scan range of potential was 0.0 to 2.0 V, and the scan rate was 1 mV/s. Results are shown in FIG. 12.

Figure 12:
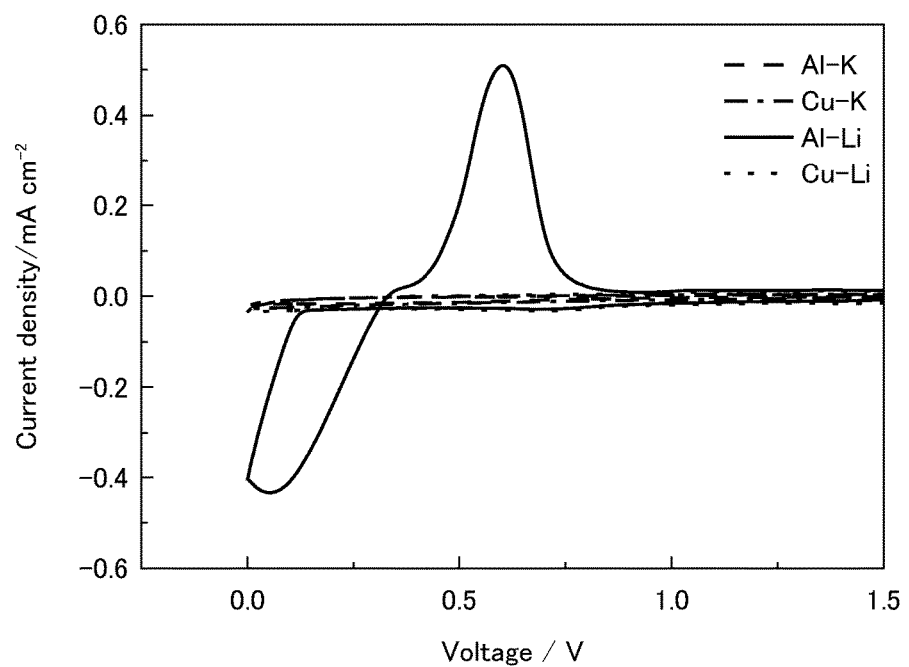
FIG. 12 is a graph illustrating the cyclic voltamograms of the potassium electrochemical cells from Examples 3 and 4 and Comparative Examples 2 and 3.

FIG. 12 shows that copper and lithium were not alloyed in the reference lithium electrochemical cell from Comparative Example 2 in which a copper foil was used as a working-electrode current collector while aluminum and lithium were reacted to make an alloy in the comparative lithium electrochemical cell from Comparative Example 3 in which an aluminum foil was used as a working-electrode current collector. This reflects a traditional problem in that an aluminum foil can not be used as a working electrode or a negative-electrode current collector for a lithium-ion secondary battery, and a copper foil needs to be used. In contrast, FIG. 12 shows that in the potassium electrochemical cells from Examples 3 and 4, potassium did not make an alloy with either a copper foil or an aluminum foil. The results reveal that either a copper foil or an aluminum foil can be used as a working electrode or a negative-electrode current collector of a potassium ion secondary battery.

Example 5

Production of Test Potassium Ion Secondary Battery (Half-cell)

(1) Production of Working Electrode

To water as a viscosity modifying solvent, 10 parts by mass of sodium polyacrylate (Kishida Chemical Co., Ltd., PAANa (molecular weight: 2,000,000 to 6,000,000)) as a binder was added, and 90 parts by mass of graphite (SEC Carbon, Limited., particle diameter: about 3 μm, SNO3) as a working-electrode active material was further added, and then mixed and stirred in a mortar to obtain a working-electrode mixture slurry. The resulting working-electrode mixture slurry was applied onto a copper foil as a working-electrode current collector, and dried in a vacuum dryer at 150° C. to obtain an electrode sheet. The above electrode sheet was punched out into a circular shape with a diameter of 1 cm using an electrode punch machine to obtain a working electrode for the present example. It is noted that the particle size of graphite was determined under an electron microscope.

(2) Assembly of Test Potassium Ion Secondary Battery (Half-cell)

A test potassium ion secondary battery (half-cell) was obtained including metal potassium cut in a dimension of 0.5×0.5 cm as a test counter electrode, the above working electrode, and the same nonaqueous electrolyte as in Example 1. A coin cell was used as a cell, and a glass filter was used as a separator.

Example 6

Production of Test Potassium Ion Secondary Battery (Half-cell)

A test potassium ion secondary battery (half-cell) was obtained as in Example 5 except that an aluminum foil was used instead of a copper foil.

<Evaluation 4>

The test potassium ion secondary batteries (half cells) each produced in Examples 5 and 6 were evaluated for charge-discharge characteristics as in Evaluation 1 (1)

except that a cycle of the charge-discharge was performed once. The resulting charge-discharge curve is shown in FIG. 13.

Figure 13:
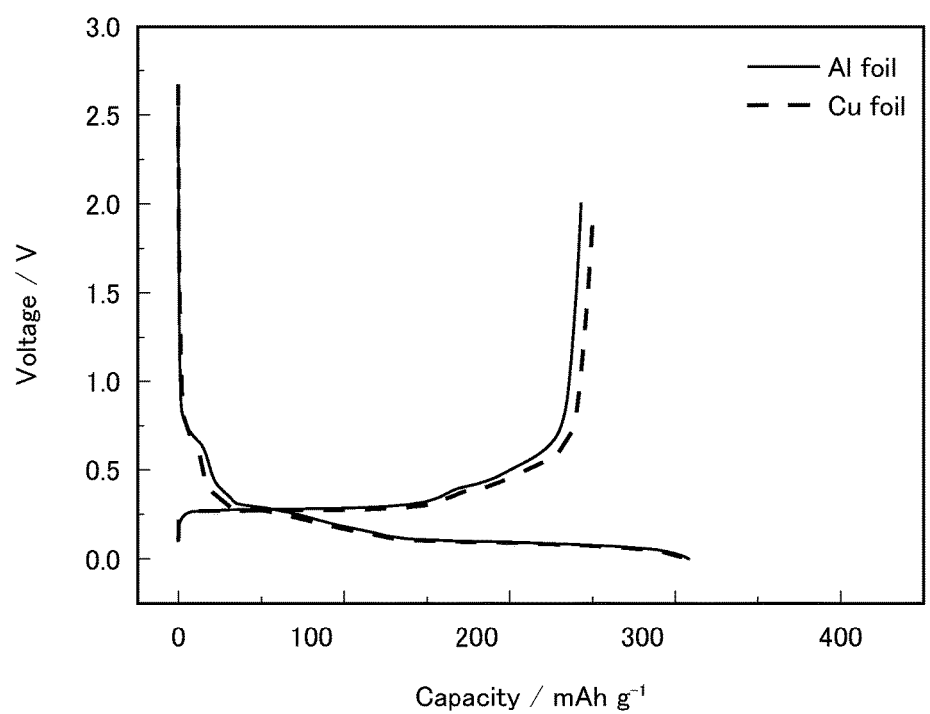
FIG. 13 is a graph illustrating the charge-discharge characteristics at the first cycle of the test potassium ion secondary batteries from Examples 5 and 6.

FIG. 13 indicates that the charge-discharge curves at the first cycle showed almost no difference between a copper foil and an aluminum foil for the test potassium ion secondary batteries (half cells) from Examples 5 and 6 in which the copper foil or aluminum foil served as a working-electrode current collector. Similarly to the results from Evaluation 3, these results also reveal that either a copper foil or an aluminum foil can be used as a working electrode or a negative-electrode current collector in a potassium ion secondary battery.

Example 7

Production of Test Potassium Ion Secondary Battery (Half-cell)

A test potassium ion secondary battery (half-cell) was obtained as in Example 6 except that sodium carboxymethylcellulose (Daicel Chemical Industries, Ltd., CMC (viscosity-average molecular weight (Mv)=1,000,000)) was used instead of sodium polyacrylate.

Comparative Example 4

Production of Reference Potassium Ion Secondary Battery (Half-cell)

A reference potassium ion secondary battery (half-cell) was obtained as in Example 6 except that poly(vinylidene fluoride) was used instead of sodium polyacrylate.

<Evaluation 5>

Figure 14:
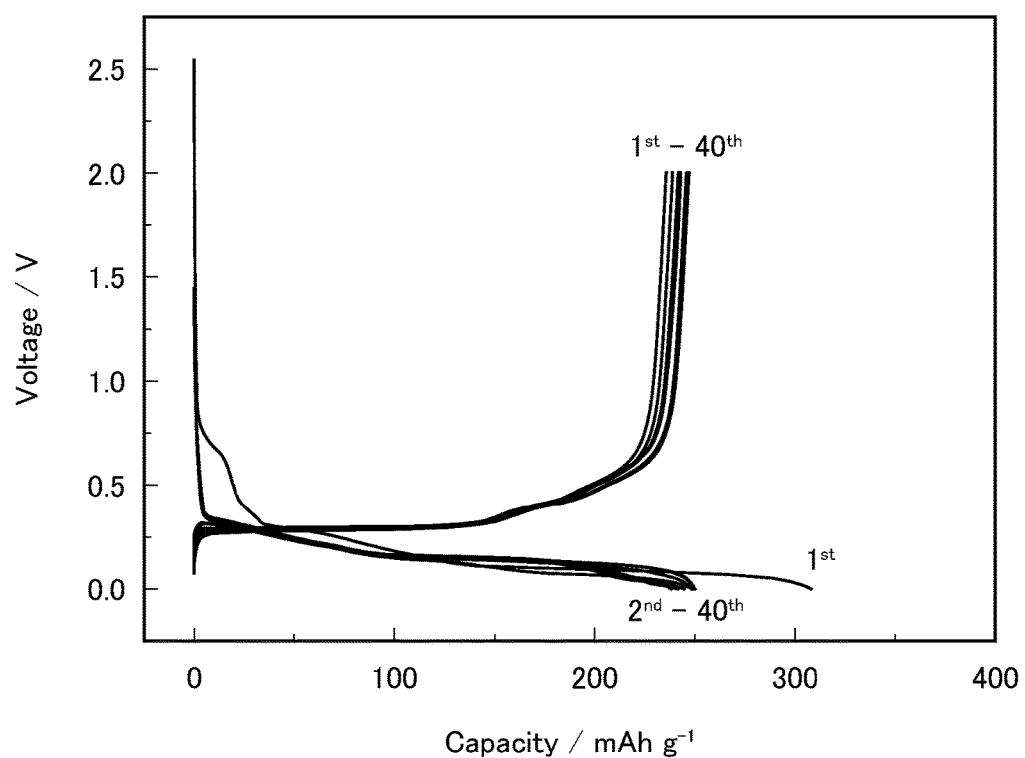
FIG. 14 is a graph illustrating the charge-discharge characteristics at the first to 40th cycles of the test potassium ion secondary battery from Example 6.

(1) The test potassium ion secondary battery (half-cell) produced in Example 6 was evaluated for charge-discharge characteristics as in Evaluation 4 except that the charge-discharge was performed for 40 cycles. The resulting charge-discharge curves are shown in FIG. 14.

Figure 15:
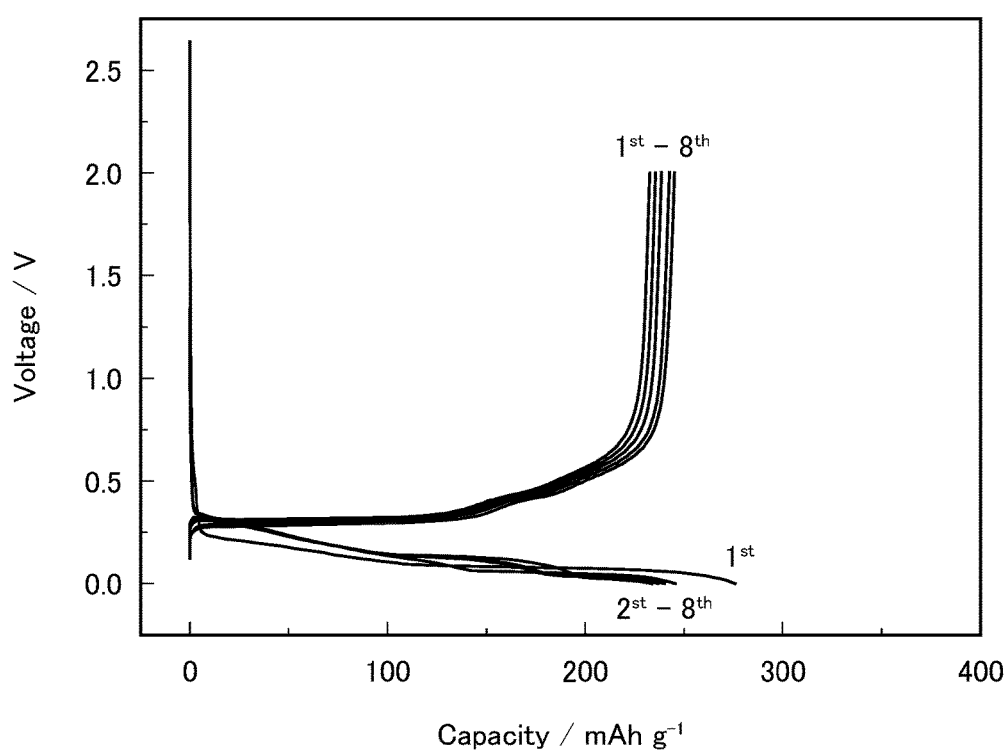
FIG. 15 is a graph illustrating the charge-discharge characteristics at the first to eighth cycles of the test potassium ion secondary battery from Example 7.

(2) The test potassium ion secondary battery (half-cell) produced in Example 7 was evaluated for charge-discharge characteristics as in Evaluation 4 except that the charge-discharge was performed for 8 cycles. The resulting charge-discharge curves are shown in FIG. 15.

Figure 16:
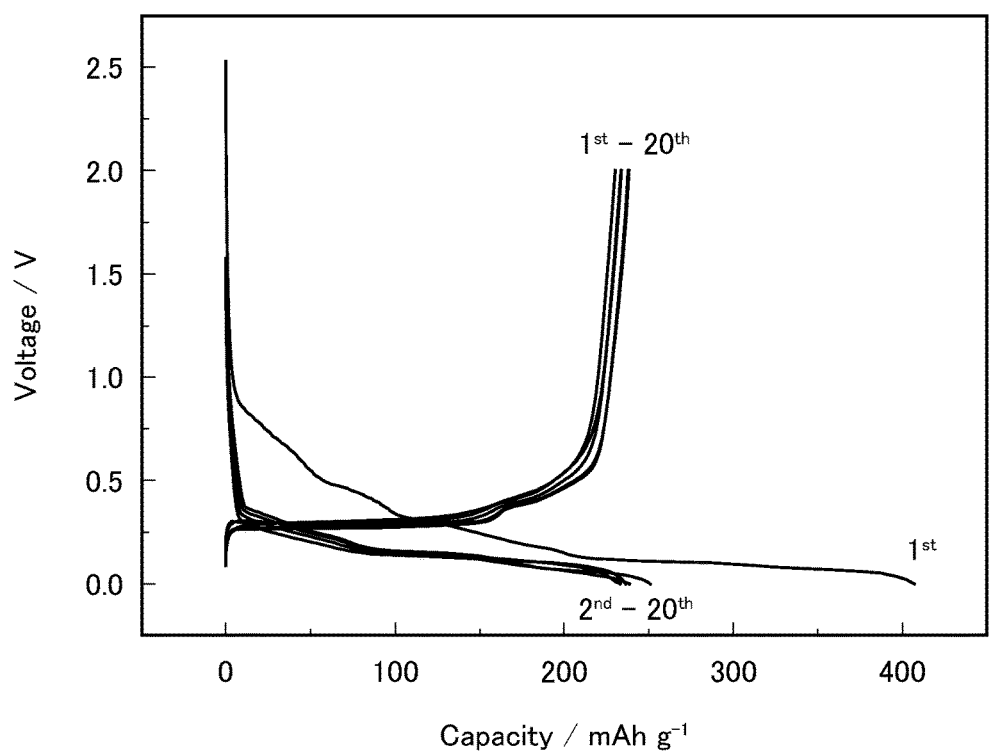
FIG. 16 is a graph illustrating the charge-discharge characteristics at the first to 20th cycle of the reference potassium ion secondary battery from Comparative Example 4.

(3) The reference potassium ion secondary battery (half-cell) produced in Comparative Example 4 was evaluated for charge-discharge characteristics as in the Evaluation 4 except that the charge-discharge was performed for 20 cycles. The resulting charge-discharge curves are shown in FIG. 16.

Figure 17:
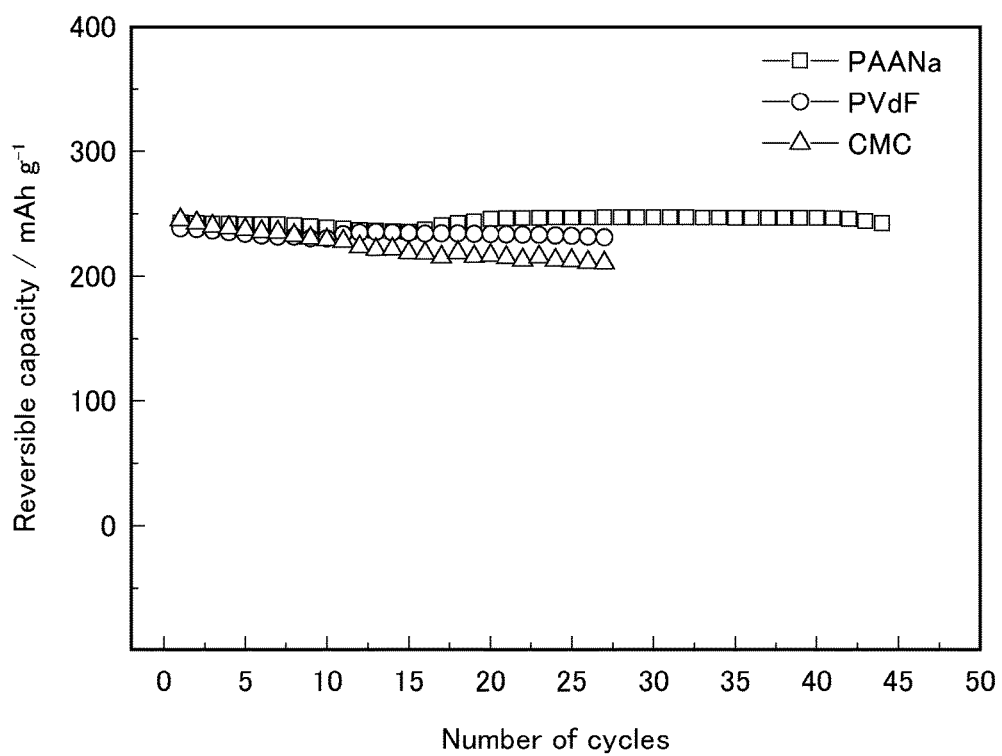
FIG. 17 is a graph illustrating the relationship between the number of cycles and the reversible capacity of each of the test potassium ion secondary batteries from Examples 6 and 7 and Comparative Example 4.
Figure 18:
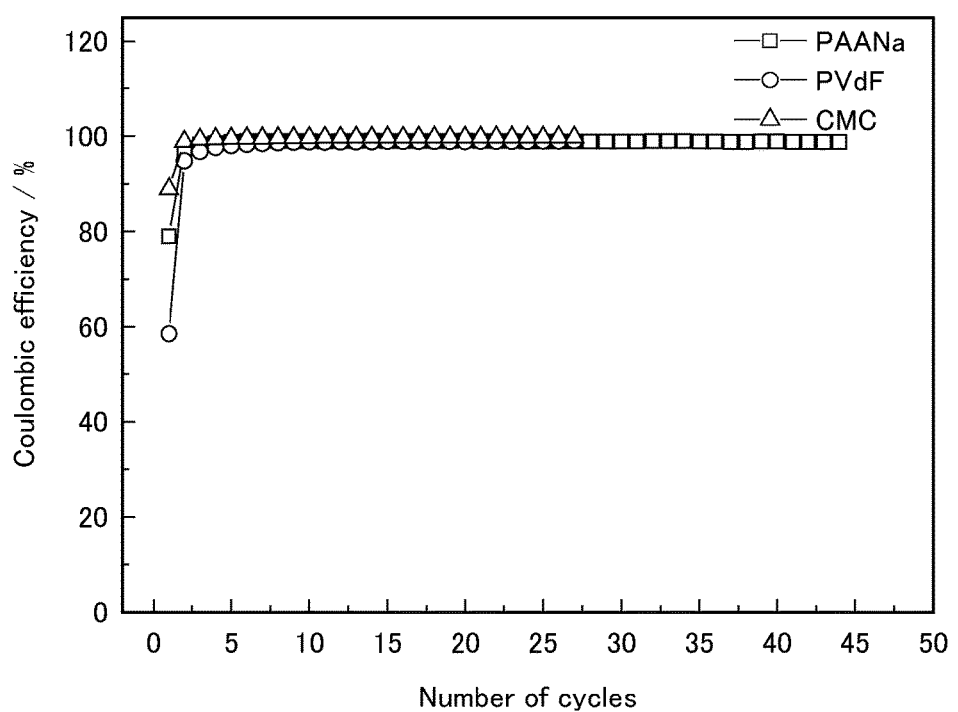
FIG. 18 is a graph illustrating the relationship between the number of cycles and the coulombic efficiency of each of the test potassium ion secondary batteries from Examples 6 and 7 and Comparative Example 4.
Figure 19:
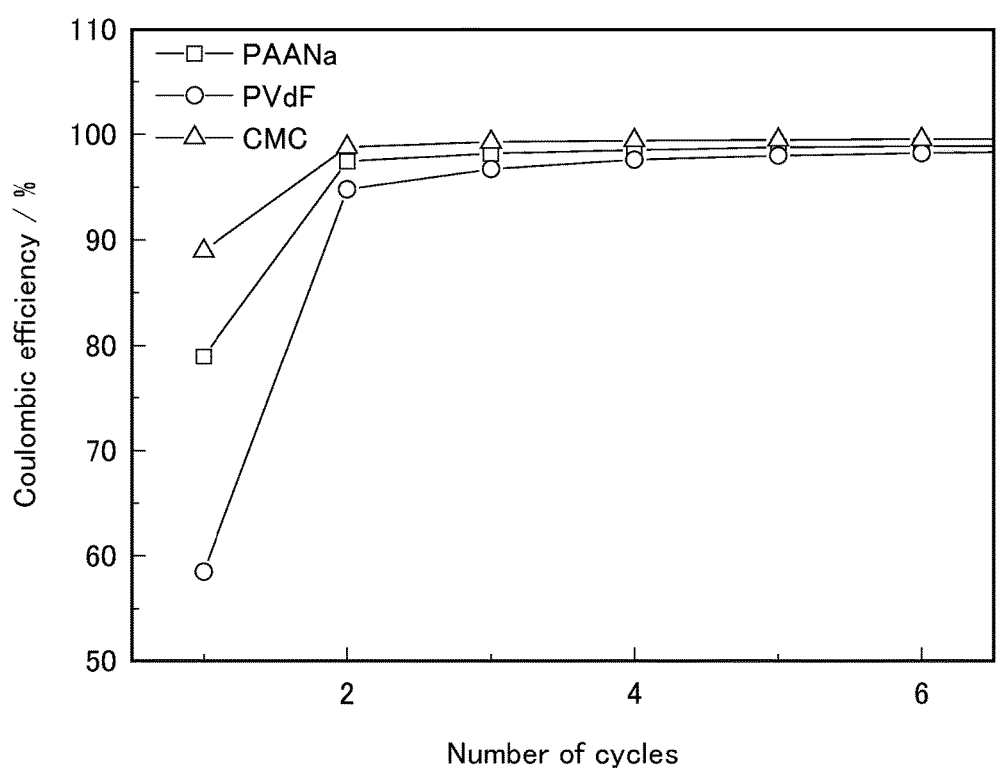
FIG. 19 shows an enlarged view of the graph in FIG. 18.

(4) Using results from the above (1) to (3), the relationship between the number of cycles and the reversible capacity is shown in FIG. 17, and the relationship between the number of cycles and the coulombic efficiency is shown in FIG. 18. FIG. 19 shows an enlarged view of a graph in FIG. 18.

FIGS. 14 and 17 indicate that the test potassium ion secondary battery (half-cell) from Example 6 showed a small decrease in the reversible capacity even after repeated charge-discharge cycles, leading to a high reversible-capacity maintenance rate. Moreover, a reversible capacity of about 250 mAh/g, which was very close to the theoretical capacity of 279 mAh/g, was obtained, demonstrating that very good charge-discharge was performed. That is, the results reveal that potassium was reversibly occluded in and released from the working electrode including a carbon material even when an aluminum foil was used as a working-electrode current collector. Similarly, FIGS. 15 and 17 indicate that the test potassium ion secondary battery (half-cell) from Example 7 also showed a small decrease in the reversible capacity even after repeated charge-discharge cycles, leading to a high reversible-capacity maintenance rate even when an aluminum foil was used as a working-electrode current collector. In contrast, FIGS. 16 and 17 indicate that the reference potassium ion secondary battery (half-cell) from Comparative Example 4 had an initial-cycle reversible capacity of about 240 mAh/g, which was comparable with those from Examples 6 and 7, but showed a significantly decreased reversible capacity after repeated charge-discharge cycles, resulting in a very low reversible-capacity maintenance rate.

FIGS. 18 and 19 indicate that the coulombic efficiency was improved more significantly for the test potassium ion secondary batteries (half cells) from Examples 6 and 7 as compared with the reference potassium ion secondary battery (half-cell) from Comparative Example 4. That is, results reveal that the coulombic efficiency can be improved more significantly for a case where sodium polyacrylate or sodium carboxymethylcellulose is used as a binder for negative electrodes as compared with a case where poly(vinylidene fluoride) is used.

<Evaluation 6>

The test potassium ion secondary battery (half-cell) produced in Example 6 was evaluated for charge-discharge characteristics. A current to each electrode was set so that the current density was 28 mA/g, and constant current discharge was performed down to a discharge voltage of 0.0 V. After the discharge, a current to each electrode was set so that the current density was 28 (C/10) to 4185 (15 C) mA/g, and for the second time and later, constant current discharge was performed until a charge voltage of 2.0 V and a discharge cutoff voltage of 0 V. Three cycles of charge-discharge were performed for each of the current densities. The relationship between the number of cycles and the charge capacity is shown in FIG. 20, and fast-charge curves are shown in FIG. 21.

Figure 20:
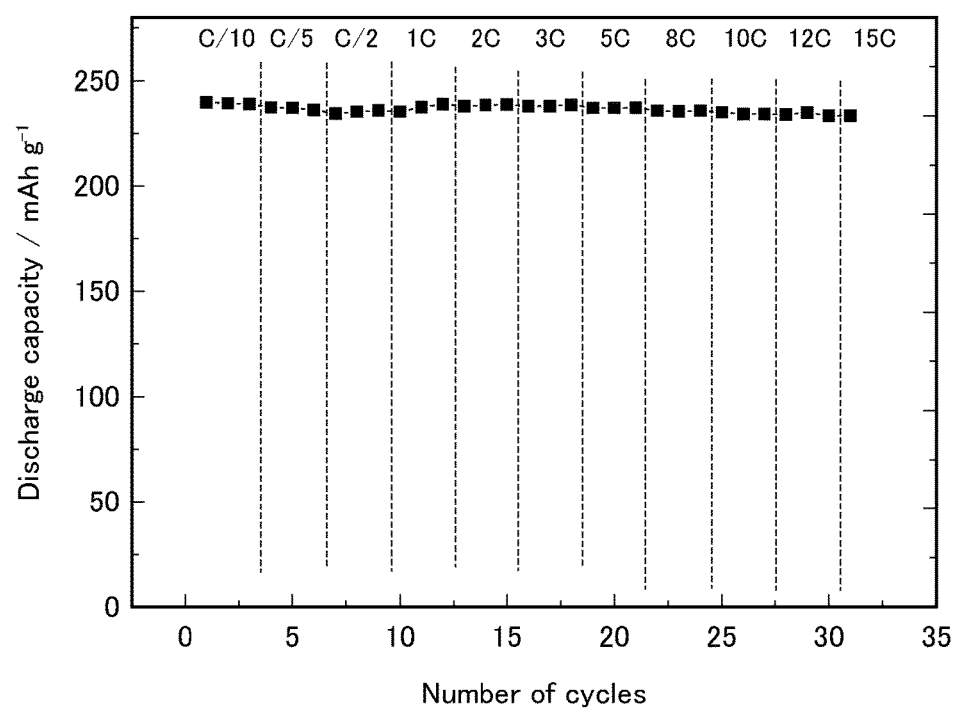
FIG. 20 is a graph illustrating the relationship between the number of cycles and the discharge capacity of the test potassium ion secondary battery from Example 6.
Figure 21:
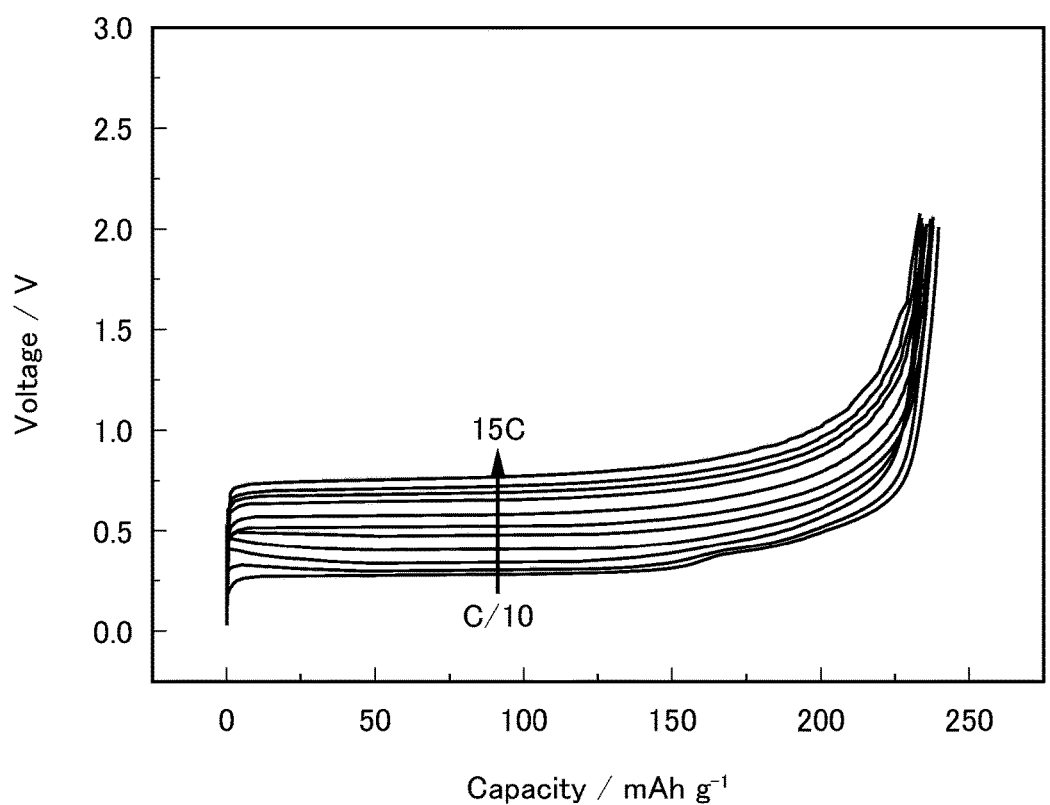
FIG. 21 is a graph illustrating the fast-charge characteristics of the test potassium ion secondary battery from Example 6.

FIGS. 20 and 21 indicate that the test potassium ion secondary battery (half-cell) from Example 6 did not show a decreased capacity even at an elevated current density when the current density was changed only during changing (release of potassium). These findings suggest that quick charge is possible. Specifically, when intercalation of potassium was performed at a rate of C/10, and release of potassium was performed at a rate of C/10 to 15 C in quick charge-discharge tests, evaluation results showed that charge was possible at a rate of 15 C, that is, charge was able to be completed in four minutes. It is noted that 1 C corresponds to a current density at which charge can be completed in 1 hour. For example, 2 C, 3 C, and 15 C correspond to a current density at which charge can be completed in 30 minutes, 20 minutes, and four minutes, respectively.

EXPLANATION OF REFERENCE NUMERALS

1 Nickel mesh (Reference electrode)
2 Nickel-mesh working electrode
3 Activated carbon
4, 5 Glass filter

The invention claimed is:
1. A potassium ion secondary battery, comprising
a negative electrode comprising
an active material capable of occluding and releasing potassium ions;

a binder including polycarboxylic acid and/or a salt thereof; and a negative-electrode current collector including aluminum, wherein the active material consists of graphite.

2. The potassium ion secondary battery according to claim 1, wherein the polycarboxylic acid and/or a salt thereof includes at least one selected from the group consisting of polyacrylic acid, alkali metal salts of polyacrylic acid, carboxymethylcellulose, and alkali metal salts of carboxymethylcellulose.

* * * * *